United States Patent
Darcie et al.

(10) Patent No.: US 7,359,580 B2
(45) Date of Patent: *Apr. 15, 2008

(54) CLASS-AB MICROWAVE-PHOTONIC LINK

(75) Inventors: Thomas E. Darcie, Victoria (CA); Peter F. Driessen, Sidney (CA)

(73) Assignee: University of Victoria Innovation and Development Corporation, Victoria, B.C. (CA)

(*) Notice: Subject to any disclaimer, the term of this patent is extended or adjusted under 35 U.S.C. 154(b) by 0 days.

This patent is subject to a terminal disclaimer.

(21) Appl. No.: 11/493,680

(22) Filed: Jul. 25, 2006

(65) Prior Publication Data

US 2007/0019896 A1 Jan. 25, 2007

Related U.S. Application Data

(60) Provisional application No. 60/702,562, filed on Jul. 25, 2005.

(51) Int. Cl.
*G02F 1/01* (2006.01)
*G02F 1/035* (2006.01)

(52) U.S. Cl. .................... 385/3; 385/1; 385/2
(58) Field of Classification Search .......... 385/1–3
See application file for complete search history.

(56) References Cited

U.S. PATENT DOCUMENTS

| | | | | |
|---|---|---|---|---|
| 5,109,441 | A * | 4/1992 | Glaab .................... | 385/1 |
| 5,168,534 | A * | 12/1992 | McBrien et al. ........ | 385/3 |
| 5,644,665 | A * | 7/1997 | Burns et al. ............. | 385/3 |
| 5,777,778 | A | 7/1998 | Yao | |
| 6,181,453 | B1 | 1/2001 | Darcie et al. | |
| 6,282,005 | B1 * | 8/2001 | Thompson et al. ........ | 398/143 |
| 6,335,814 | B1 | 1/2002 | Fuse et al. | |
| 6,359,716 | B1 | 3/2002 | Taylor | |
| 6,744,546 | B2 | 6/2004 | Nakamura et al. | |
| 7,079,780 | B1 * | 7/2006 | Rollins .................... | 398/198 |
| 2002/0033987 | A1 | 3/2002 | Fuse et al. | |
| 2005/0286908 | A1 | 12/2005 | Way | |
| 2006/0285787 | A1 | 12/2006 | Sakane et al. | |

OTHER PUBLICATIONS

Burns et al.; "Multi-Octave Operation of Low-Biased Modulators by Balanced Detection"; Photonics Technology Letters, IEEE; vol. 8 Issue 1; Jan. 1996, pp. 130-132.*

Mathai et al.; "Experimental Demonstration of a Balanced Electroabsorption Modulated Microwave Photonic Link"; Mircrowave Theory and Techniqes, IEEE Transaction on; vol. 49, Issue 10, Part 2; Oct. 2001, pp. 1056-1961.*

(Continued)

*Primary Examiner*—Hemang Sanghavi
*Assistant Examiner*—Kajli Prince
(74) *Attorney, Agent, or Firm*—Klarquist Sparkman, LLP

(57) ABSTRACT

Embodiments of a photonic link having low residual carrier, for use in transmitting information between an electronic signal source and an electronic signal receiver are provided. One exemplary photonic link comprises a transmitter, which has two non-linear threshold electronic to optical converters that are biased to provide large even-order distortion, an optical signal receiver and at least one optical transmission path to transmit complementary modulated signals between the transmitter and the optical signal receiver, whereby the optical signal receiver reconstructs the complementary modulated signals into the electronic information for acceptance by the electronic signal receiver. Exemplary methods of transmitting information are also provided.

34 Claims, 4 Drawing Sheets

OTHER PUBLICATIONS

Nichols et al.; "Optimizing the ultrawide-band photonic link"; Mircrowave Theory and Techniqes, IEEE Transaction on; vol. 45, Issue 8, Part 2; Aug. 1997, pp. 1384-1389.*

Cox et al.; "An analytic and experimental comparison of direct and external modulation in analog fiber-optic links"; Mircrowave Theory and Techniqes, IEEE Transaction on; vol. 38, Issue 5; May 1990; pp. 501-509.*

Burns et al., "Multi-Octave Operation of Low-Biased Modulators by Balanced Detection," *IEEE Photonics Technology Letters*, vol. 8, Issue 1, pp. 130-132 (Jan. 1996).

Cai et al., "Optical frequency modulation links: theory and experiments," *IEEE Trans. Microwave Theory and Techniques*, vol. 45, pp. 505-511 (1997).

Chen et al., "FM subcarrier fiber optical transmission system design and its application in next-generation wireless access," *IEEE Journal of Lightwave Technology*, vol. 16, pp. 1137-1148 (1998).

Cox III et al., "An Analytic and Experimental Comparison of Direct and External Modulation in Analog Fiber-Optic Links," *IEEE Trans. Microwave Theory and Techniques*, vol. 38, pp. 501-509 (May 1990).

Cox III et al., *Analog Optical Links: Theory and Practice*, 288 pp. (2004).

Darcie et al., "Noise reduction in class-AB microwave-photonic links," *IEEE Microwave Photonics 2005 Conference Proceedings* (Seoul, Korea, Oct. 2005).

Delavaux et al., "Multiple-Output $Er^{3+}$ Amplifier for Analog and QAM Distribution Systems," *Optical Fiber Communications Conference*, vol. 3, pp. WDD30-1-3 (2001).

Esman et al., "Wideband Efficiency Improvement of Fiber Optic Systems by Carrier Subtraction," *IEEE Photonics Technology Letters*, vol. 7, No. 2, pp. 218-220 (Feb. 1995).

Georges et al., "Broadband Microwave Fiber-Optic Links with RF Phase Control for Phased-Array Antennas," *IEEE Photonics Technology Letters*, vol. 5, Issue 11, pp. 1344-1346 (Nov. 1993).

Lindsay, "An Analysis of Coherent Carrier Suppression for Photonic Microwave Links," *IEEE Trans. Microwave Thoery and Techniques*, vol. 47, No. 7, pp. 1194-1200 (Jul. 1999).

Mao et al., "Brillouin Scattering in Externally Modulated Lightwave AM-VSB CATV Transmission Systems," *IEEE Photonics Technology Letters*, vol. 4, No. 3, pp. 287-289 (Mar. 1992).

Mathai et al., "Experimental Demonstration of a Balanced Electroabsorption Modulated Microwave Photonic Link," *IEEE Trans. Microwave Theory and Techniques*, vol. 49, No. 10, pp. 1956-1961 (Oct. 2001).

Murakoshi et al., "Proposal of SCM optical FM method with nonlinear compensation technique in radio on fiber link," *Microwave Photonics, 2004, MWP'04, 2004 IEEE International Topical Meeting*, pp. 237-240 (2004).

Nichols et al., "Optimizing the Ultrawide-Band Photonic Link," *IEEE Trans. Microwave Theory and Techniques*, vol. 45, No. 8, pp. 1384-1389 (Aug. 1997).

Phillips et al., "Lightwave Analog Video Transmission," in *Optical Fiber Telecommunications IIIA*, Chapter 14, pp. 523-559 (1997).

Phillips et al., "Nonlinear Distortion Generated by Dispersive Transmission of Chirped Intensity-Modulated Signals," *IEEE Photonics Technology Letters*, vol. 3, No. 5, pp. 481-483 (May 1991).

Rivas et al., "Transmitter Macrodiversity in Radio Fibre Microcellular Networks," *PIMRC*, vol. 3, pp. 1074-1078 (Sep. 1997).

Trask, "High Efficiency Broadband Linear Push-Pull Power Amplifiers Using Linearity Augmentation," *IEEE International Symposium on Circuits and Systems*, vol. 2, pp. II-432 to II-435 (May 2002).

Wood et al., "FiberVista: A Cost-Effective Fiber-to-the-Home (FTTH) System Providing Broad-Band Data Over Cable Modems Along with Analog and Digital Video," *IEEE Photonics Technology Letters*, vol. 11, No. 4, pp. 475-477 (Apr. 1999).

* cited by examiner

CLASS-AB MICROWAVE-PHOTONIC LINK

CROSS REFERENCE TO RELATED APPLICATION

This application claims the benefit of U.S. Provisional Patent Application No. 60/702,562, filed Jul. 25, 2005, and entitled "CLASS-AB MICROWAVE-PHOTONIC LINK," which is hereby incorporated herein by reference.

FIELD

The disclosed technology relates to photonic links for transmitting information to and from users. More specifically, the disclosed technology relates to a system and method wherein the residual carrier is minimized, thus reducing both shot noise and relative-intensity noise (RIN).

BACKGROUND

Analog or microwave-photonic optical links have found widespread application in numerous sectors of communications. All modern cable-television networks use high-performance linear lasers and optical fiber to deliver the entire spectrum of analog video and subcarrier-modulated digital data to and from small groups of subscribers. See, e.g., T. E. Darcie, M. R. Phillips, "Lightwave Video Transmission," Chapter in *Optical Fiber Telecommunications IIIA*, Academic Press, NY (1997). Other broadband access or last-mile networks, like the fiber-to-the-premises networks being deployed by telephone carriers throughout the world, also use analog optical links for transmission of broadband RF-modulated signals. See, e.g., T. H. Wood, G. C. Wilson, R. D. Feldman, J. A. Stiles, "(FTTH) system providing broad-band data over cable modems along with analog and digital video," *IEEE Photonics Technol. Lett.*, Volume 11, Issue 4, pp. 475-477 (April 1999). With the allocation of new high-frequency (e.g. 60 GHz) microwave bands for communications networks, optical links become an essential component in overcoming loss associated with coaxial or waveguide alternatives. Cellular base stations are often connected to remote antennas or groups of antennas by microwave-photonic links. See, e.g., I. Rivas, L. B. Lopes, "Transmitter macrodiversity in radio fibre microcellular networks," *Personal, Indoor and Mobile Radio Comm., PIMRC*, Vol. 3, 1-4, pp. 1074-1078 (September 1997). Phased-array microwave and millimeter-wave antennas use microwave-photonic links to deliver phase reference and signal information to and from centralized processors. See, e.g., J. B. Georges, K. Y. Lau, "Broadband microwave fiber-optic links with RF phase control for phased-array antennas," *IEEE Photonics Technol. Lett.*, Vol. 5, Issue 11, pp. 1344-46 (November 1993). In short, the transmission of microwave information as modulated optical signals through optical fiber has become an essential tool in modern communications networks. As a result, considerable work has gone into maximizing the performance of these links. See, e.g., C. H. Cox III, G. E. Betts, and L. M. Johnson, "An analytic and experimental comparison of direct and external modulation in analog fiber-optic links," *EEE Trans. Microwave Theory and Techniques*, vol. 38, pp. 501-509 (May 1990); L. T. Nichols, K. J. Williams, and R. D. Esman, "Optimizing the ultrawide-band photonic link," *IEEE Trans. Microwave Theory and Techniques*, vol. 45, pp. 1384-1389 (August 1997).

Impairments introduced by microwave-photonic links (MPLs) include primarily noise and distortion. Noise limits the minimum microwave signal level that can be detected. Linearity limits the maximum microwave signal power that can be transmitted. The difference between minimum and maximum is described by the spur-free dynamic range (SFDR), one of the key figures of merit for an MPL. See, e.g., C. H. Cox, III, "Analog Optical Links: Theory and Practice", Cambridge (2004). Performance is measured by the ability of the optical link to preserve the fidelity of the transmitted microwave signal, as measured by parameters like the SFDR, composite-triple beat (CTB), carrier-to-noise-ratio (CNR), and link gain. Collectively, these parameters describe the ability of the link to deliver large modulated signals while minimizing noise or interference.

In most systems, the light source (directly-modulated laser or continuous-wave (CW) laser followed by an external modulator) is biased to a linear operating point, and the RF signal is applied symmetrically about this bias point. The DC light intensity, or residual carrier, associated with this bias carries no information, but is responsible for many of the limitations of the link performance. Shot noise and relative-intensity noise (RIN), often the dominant noise sources in high-power links, result directly from the detection of this residual carrier. In systems using optical amplifiers, beating between the carrier and amplified spontaneous emission result in high levels of signal-spontaneous beat noise. Also, the available gain of the optical amplifier is consumed or saturated by this residual carrier, rather than by the desired signal. See, e.g., J. M. P. Delavaux, A Yeniay, B Neyret, C. Hullin, G. R. Wilson, "Multiple-output Er-3+ amplifier for analog and QAM distribution systems," *Optical Fiber Communications Conference*, Vol. 3, pp. WDD30-1-3 (2001). The residual carrier is subject to optical nonlinearities (stimulated Brillouin scattering (see, e.g., X. P. Mao, G. E. Bodeep, R. W. Tkach, A. R. Chraplyvy, T. E. Darcie, R. M. Derosier, "Brillouin scattering in externally modulated lightwave AM-VSB transmission systems," *IEEE Photonics Technol. Lett.*, Vol. 4, Issue 3, pp. 287-289 (March 1992)), nonlinear refractive index (see, e.g., M. R. Phillips, T. E. Darcie, D. Marcuse, G. E. Bodeep, N. J. Frigo, "Nonlinear distortion generated by dispersive transmission of chirped intensity-modulated signals," *IEEE Photonics Technol. Lett.*, Vol. 3, Issue 5, pp. 481-483 (May 1991)), stimulated Raman scattering) limiting the amount of power that can be transmitted through the fiber. Finally, this residual carrier constitutes most of the power that saturates the photodetector, limiting the maximum signal power. Hence the DC bias required to operate at a linear operating point limits both the low end (noise) and high end (signal power) of the SFDR.

A variety (5 classes) of techniques has been proposed to mitigate the effect of the residual carrier. First, the carrier can be reduced through optical filtering. See, e.g., R. D. Esman, K. J. Williams, "Wideband efficiency improvement of fiber optic systems by carrier subtraction," *IEEE Photonics Technol. Lett.*, Vol. 7, No. 2, pp. 218-220 (February 1995). This has the same effect as increasing the modulation index (or lowering the DC bias) with commensurate increases in nonlinear distortion.

Second, coherent techniques have been proposed which use heterodyne detection to overcome the linearity associated with low- bias operation of a Mach Zehnder (MZ) external modulator. See, e.g., A. C. Lindsay, "An analysis of coherent carrier suppression for photonic microwave links," *IEEE Trans. Microwave Theory and Tech.*, Vol. 47, Issue 7, pp. 1194-1200 (July 1999). Unfortunately, the local oscillator generates noise that will offset the low-bias gain, and considerable complexity is added, including a frequency-stabilized laser that is required at the receiver.

Third, the bias can be modulated dynamically in response to the instantaneous magnitude of the RF envelope. See, e.g., U.S. Pat. No. 6,181,453 entitled "Method and apparatus for laser performance enhancement," and issued on Jan. 30, 2001 to T. E. Darcie and P. P. Ianonne. This can reduce the effective DC level, especially for signals with large peak factors, but the nonlinear mixing between the signal and bias modulation (the square of the signal) creates problematic third-order distortion. Also, while this approach can reduce noise from the residual carrier, the minimum average power remains substantially larger than zero, limiting the ultimate improvement.

Fourth, common-mode RIN (RIN present at the input to a Mach-Zehnder modulator (MZ)) can be cancelled using two fibers and a balanced photodetector. See, e.g., S. Mathai, F. Cappelluti, T. Jung, D. Novak, R. B. Waterhouse, D. Sivco, A. Y. Cho, G. Ghione, M. C. Wu, "Experimental demonstration of a balanced electroabsorption modulated microwave photonic link," *IEEE Trans. Microwave Theory and Tech.*, vol. 49, pp. 1956-1961 (October 2001). Significant suppression of RIN has been demonstrated, but this does not affect the other challenges associated with the large residual carrier. Also, it has been shown that this technique results in reduced suppression of intensity noise for signals with larger modulation index.

Fifth, low-bias techniques have been explored in which an MZ is operated at lower bias than the conventional quadrature bias point (50% transmission). Unfortunately, this increases the distortion and decreases the signal, limiting the usefulness of the approach. In an attempt to reduce the distortion of this low-bias technique, an approach was explored in which 2 MZs were operated in an anti-symmetric manner with a balanced detector. See, e.g., W. K. Burns, G. K. Gopalakrishnan, R. P Moeller, "Multi-octave operation of low-biased modulators by balanced detection," *IEEE Photonics Technol. Lett.*, Volume 8, Issue 1, pp. 130-132 (January 1996). Reduction of second-order distortion was demonstrated, but maintaining the appropriate balances was challenging and overall improvement in noise was not demonstrated. The intent was to minimize second-order distortion in a low-biased link to achieve broadband operation. Hence the modulators were biased at an operating point at which the even-order distortion was small.

To summarize, there are 3 main causes of noise: Receiver noise; shot noise; and relative intensity noise (RIN). Shot noise power increases linearly with total received power. Noise from RIN increases as the square of total received power. Receiver noise is independent of received power. While the prior art has been somewhat successful in reducing receiver noise and the effect of RIN, to date and to our knowledge, no practical method for reducing shot noise has been defined and RIN continues to be a problem. It is an object to overcome the deficiencies of the prior art.

SUMMARY

Embodiments of the disclosed technology overcome limitations with the prior art through the application of Class-AB techniques to microwave-photonic links. Class-AB electronic amplifiers have been used to increase the linear range of amplifier operation. See, e.g., C. Trask, "High efficiency broadband linear push-pull power amplifiers using linearity augmentation, *IEEE International Symposium on Circuits and Systems, ISCAS* 2002, Volume 2, pp. 11-432 to 11-435 (May 26-29, 2002). In Class-AB electronic amplifiers, two identical transistors are used in a complementary manner to amplify separately the positive and negative portions of an electronic signal. These are then combined in a manner that minimizes distortion and maximizes the output power. Embodiments of the disclosed technology concern the application of similar techniques to the reduction of carrier-related noise in microwave-photonic links. Hence we refer to these links as Class-AB microwave-photonic links (CAB-MPLs).

A photonic link having low residual carrier is provided, for use in transmitting information between an electronic signal source and an electronic signal receiver. The photonic link comprises a transmitter, an optical signal receiver and at least one optical transmission path. The transmitter is to accept electronic information from the electronic signal source and to transmit optical signals. It comprises a first and second non-linear threshold electronic to optical converter to convert the electronic information into optical signals, wherein the non-linear electrical to optical converters are biased to provide large even-order distortion. The first non-linear threshold electrical to optical converter is complementary to the second non-linear threshold electrical to optical (E-O) converter, to provide a first and second modulated signal in which the first modulated signal is complementary to the second modulated signal. The at least one optical transmission path is to transmit the complementary modulated signals between the transmitter and the optical signal receiver, whereby the optical signal receiver reconstructs the complementary modulated signals into the electronic information for acceptance by the electronic signal receiver.

In one aspect, the first and the second non-linear threshold E-O converters comprise at least one directly modulated optical source.

In another aspect, the first and the second non-linear threshold E-O converters comprise at least one directly modulated laser.

In another aspect, the first and the second non-linear threshold E-O converter comprise at least one external modulator configured to modulate the output of at least one optical source.

In another aspect, the first and the second non-linear threshold E-O converter comprise at least one externally modulated laser.

In another aspect, the photonic link further comprises at least one modulator.

In another aspect, the modulators are Mach-Zehnder modulators.

In another aspect, the modulators are electro-absorption modulators.

In another aspect, the optical signal receiver comprises a balanced receiver.

In another aspect, the balanced receiver comprises a first and a second photodetector, each having an anode and a cathode, wherein the anode of the first photodetector is connected to the cathode of the second photodetector, such that in use, the electronic information is reconstructed.

In another aspect, the optical transmission path comprises one transmission fiber.

In another aspect, the optical transmission path comprises two transmission fibers.

In another aspect, the optical transmission path comprises at least one free-space optical path.

In another aspect provides a photonic link having low residual carrier, for use in transmitting information between an electronic signal source and an electronic signal receiver. The photonic link comprises a transmitter, an optical signal receiver, a combiner and one transmission fiber. The transmitter is to accept electronic information from the electronic signal source and to transmit optical signals. It comprises a first and second non-linear threshold electronic to optical converter to convert the electronic information into optical signals, wherein the non-linear electrical to optical converters are biased to provide large even-order distortion. The first non-linear threshold electrical to optical converter is complementary to the second non-linear threshold electrical to optical (E-O) converter, to provide a first and second modulated signal in which the first modulated signal is complementary to the second modulated signal. The combiner is to combine the first and second modulated signals over the one transmission fiber and to separate them at the optical signal receivers to transmit the complementary modulated signals between the transmitter and the optical signal receiver, whereby the optical signal receiver reconstructs the complementary modulated signals into the electronic information for acceptance by the electronic signal receiver. The optical signal receiver comprises a first and a second photodetector, each having an anode and a cathode, wherein the anode of the first photodetector is connected to the cathode of the second photodetector.

In another embodiment, a method of transmitting information between an electronic signal source and an electronic signal receiver is provided. The method comprises accepting electronic information from the electronic signal source, biasing each of two nonlinear threshold electronic to optical converters to provide large even-order distortion, converting the electronic information into two complementary modulated optical signals with large even-order distortions, transmitting the complementary modulated optical signals, and reconstructing the complementary modulated signals into the electronic information for acceptance by the electronic signal receiver.

In one aspect, the electronic information is microwave.

In another aspect, the conversion comprises modulating the output of at least one optical source by applying the electronic information with at least one external modulator.

In another aspect, the conversion is effected by converters operating at a bias point such that the square root of the variance of the modulating microwave signal is greater than the difference between the bias point and the threshold point.

In another aspect, the conversion is effected by converters operating at a bias point that provides a modulation index of greater than approximately 0.7.

In another aspect, the conversion comprises modulating the output of at least one optical source by applying the electronic information with at least one external modulator.

In another aspect, modulating is effected by the modulators operating in a highly non-linear mode.

In another aspect, the modulators are operating at a bias point of less than approximately 25% maximum transmission.

In another aspect, the modulators are operating at a bias point of less than approximately 20% maximum transmission.

In another aspect, the modulators are operating at a bias point of less than approximately 15% maximum transmission.

In another aspect of the method, the modulators are Mach-Zehnder modulators.

In another aspect, biasing of the modulators is at less than 45 degrees from zero transmission.

In another aspect, biasing of the modulators is at less than 40 degrees from zero transmission.

In another aspect, biasing of the modulators is at less than 35 degrees from zero transmission.

In another aspect, biasing of the modulators is at less than 30 degrees from zero transmission.

In another aspect, the method further comprises multiplexing to combine the complementary modulated optical signals for transmission on one transmission fiber.

In another aspect, the method further comprises optical amplification.

In another embodiment, a photonic link having low residual carrier, for use in transmitting information between an electronic signal source and an electronic signal receiver is provided that comprises: a transmitter to accept electronic information from the electronic signal source and to transmit an optical signal, the transmitter comprising a non-linear threshold electronic to optical converter to convert the electronic information into an optical signal and wherein the non-linear threshold electrical to optical converter is biased to provide large even-order distortion and in which the converter is biased such that the normalized modulation index exceeds 1; an optical signal receiver; and an optical transmission path to transmit the optical signal between the transmitter and the optical signal receiver, whereby the optical signal receiver reconstructs the optical information into reconstructed electronic information containing large even-order distortion for acceptance by the electronic signal receiver.

In one aspect, the optical transmission path comprises a free-space optical path.

In another embodiment, a method of transmitting information between an electronic signal source and an electronic signal receiver is provided comprising: accepting electronic information from the electronic signal source; biasing a nonlinear threshold electronic to optical converter to provide large even-order distortion and a normalized modulation index exceeding 1; converting the electronic information into an optical signal with large even-order distortions; transmitting the optical signal; and reconstructing the optical signal into reconstructed electronic information containing large even-order distortion for acceptance by the electronic signal receiver.

In one aspect of the method, the optical signals are transmitted by a free-space optical path.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Furthermore, the term "microwave information" refers to any form of microwave, millimeter wave, or analog radio-frequency signal. The term "nonlinear threshold electrical-to-optical (E-O) converter" refers to a device that has a light-output-versus- current (or voltage) transfer function that, when biased in the vicinity of the threshold, approximately half-wave rectifies an input microwave signal. Examples include laser diodes, and externally modulated optical sources in conjunction with Mach-Zehnder modulators or Electro-absorption modulators. The term "complementary converters or paths" refers to a pair of approximately identical converters or paths wherein the transfer function of one is inverted relative to the other with respect to the polarity of the input microwave information. The term "directly modulated laser diode" refers to a laser diode or injection-locked laser diode that is intensity modulated by direct modulation of applied current. The term "externally-modulated laser" refers to a laser operated by continuous-wave pumping but modulated using an external device such as a Mach-Zehnder electro-optic modulator or electro-absorption modulator. The term "optical multiplexing and demultiplexing technique" refers to the use of polarization or wavelength multiplexing components to combine (multiplex) or separate (demultiplex) modulated optically signals onto one fiber such that they can separated after transmission. The term "optical communications path" refers to a single optical fiber or free-space optical connection between a transmitter and receiver. The term "balanced detector" refers to a pair of closely-matched photodetectors with the anode of one connected electrically to the cathode of the other, with the output signal taken from this junction.

Figure 1:
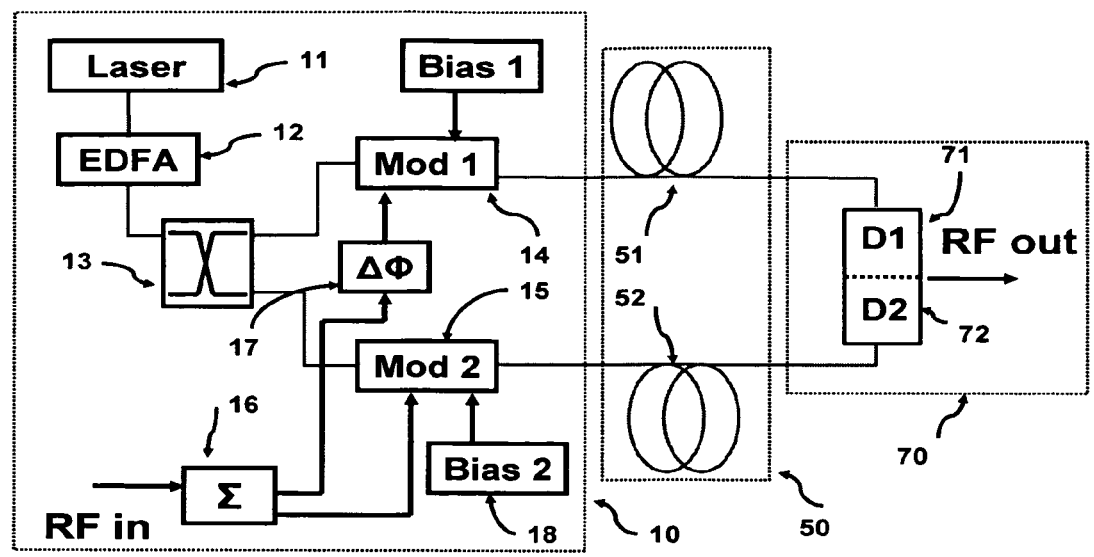
FIG. 1 is a schematic block diagram of a photonic link in accordance with an embodiment, based on the use of external modulators.

A representation of an exemplary CAB-MPL is shown in FIG. 1. An optical carrier generated by optical source 11 is split into two equal portions by coupler 13 and delivered to two complementary optical modulators 14 and 15. These are biased to appropriate operating points by voltage or current sources 18 and modulated about these bias points by the input microwave signal. Coupler 16 is used to provide identical modulation signals for each of the modulators 14, 15, and a phase controller 17 is used to control the relative phase of the modulating signals reaching the two modulators 14, 15. The coupler, modulators and phase controller components collectively comprise the transmitter 10.

An optical transmission path 50, comprised of first and second transmission fibers 51 and 52, deliver the complementary modulated signals to an optical signal receiver 70. This receiver 70 is a balanced photodetector consisting of two photodetectors, a first photodetector 71 and a second photodetector 72 with the anode of either the first 71 or second photodetector 72 connected to the cathode of the other photodetector. At this common junction, photocurrent generated in either the first 71 or second photodetector 72 is subtracted from that generated in the other photodetector, resulting in reconstruction of the original microwave signal as an output microwave signal to be received by an electronic signal receiver.

Figure 2:
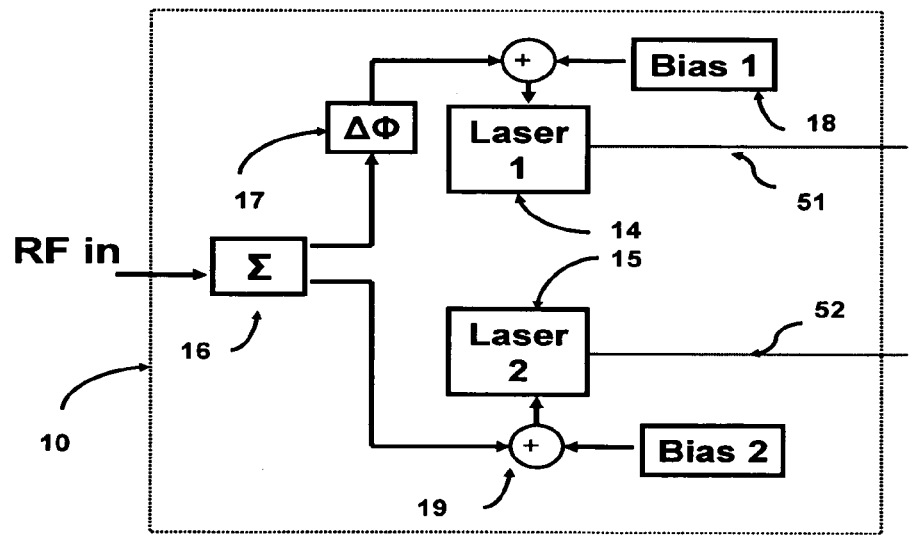
FIG. 2 is a schematic block diagram of an alternative embodiment of the transmitter, based on the use of directly-modulated lasers.

An alternative implementation of the transmitter 10 using directly-modulated lasers (e.g. diode, semiconductor) is shown in FIG. 2. Here the modulators of FIG. 1 have been replaced with directly modulated lasers 14 and 15. Modulation current from the RF input through splitter 16 is combined with the DC bias current supplied by bias current supplies 18 in the bias circuits (or Bias T) 19. The optical source and the modulators collectively are referred to as converters, whether or not the converter is integrated (internally modulated optical source) or is an externally modulated optical source and external modulators.

Figure 3A:
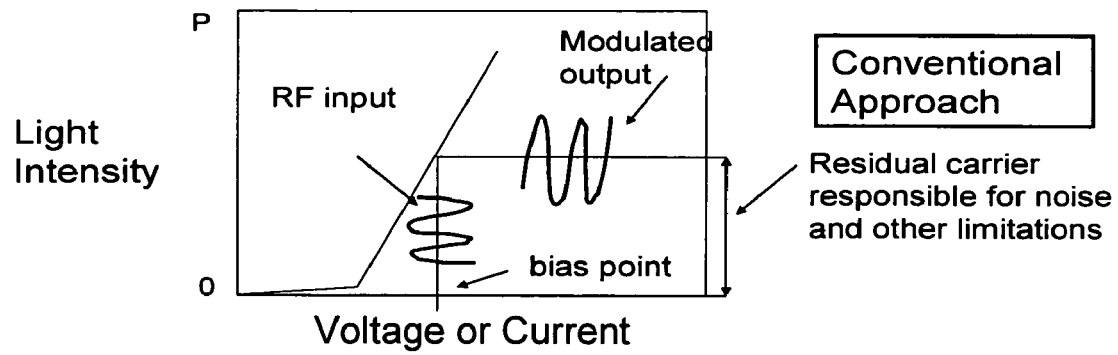
FIGS. 3A and 3B are graphs comparing an embodiment of the disclosed method of operation (FIG. 3B) with that of a conventional optical link (FIG. 3A).
Figure 3B:
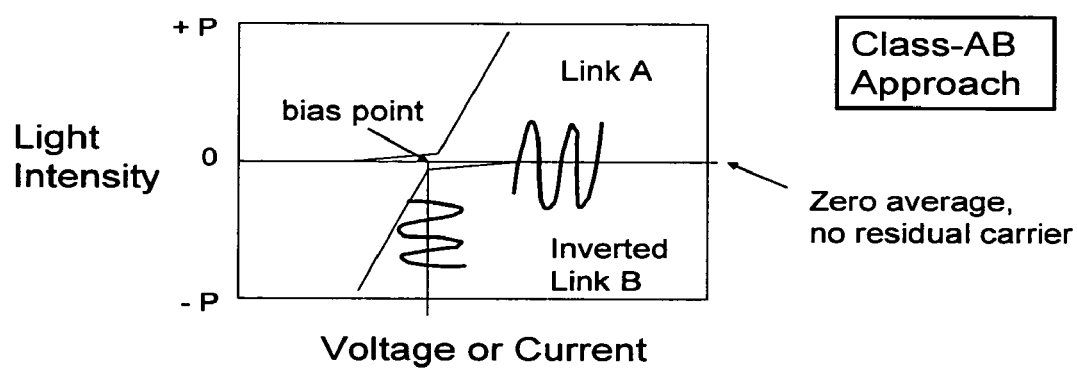

One feature of the modulated optical sources is that they exhibit substantially nonlinear or threshold behavior in the light-versus-voltage (or current) turn-on characteristics (or transfer function), as is generally the case for appropriately-biased directly-modulated lasers, and is approximately the case for appropriately-biased external modulators. Devices operated in this mode will be referred to as non-linear threshold electrical-to-optical (E-O) converters (NTEOC). The ideal transfer function for a NTEOC for Class-AB applications is shown in FIG. 3B, in comparison with a similar device operated in a conventional manner. In conventional use, as shown in FIG. 3A, the bias point is high enough that modulation induced by the RF input creates a replica of the RF input in the modulated output optical intensity. This results in penalties arising from the DC bias point or residual carrier. In FIG. 3B, however, two devices are operated in a complementary manner, with each biased so as to provide only half of the modulated output signal. What is delivered into the first transmission fiber 51 (FIG. 1) from NTEOC 14 is essentially zero light for voltage (or current) below threshold, and a light intensity that is essentially linearly proportional to voltage above threshold. This is reversed for the complementary modulated source 15 that delivers modulated optical power into the second transmission fiber 52. Note that the complement can be realized by inverting the RF signal, and does not require design of a physically distinct NTEOC. It can be seen that the result of the subtraction in the optical signal receiver 70 is to create an effective transfer function for the link that is shown in FIG. 3B. Modulation by the input microwave signal about the bias point impresses one half of the half-wave-rectified microwave signal onto the light intensity in one transmission fiber 51, and the opposite half to the other transmission fiber 52. The result is a linear transfer function with zero average bias (or residual carrier).

We have analyzed this ideal case and shown that shot noise results only from the modulated signal power, rather than from the DC bias point. For a single modulating microwave carrier, with a 10% modulation index, the shot noise is reduced by approximately 12 dB, relative to the shot noise in a conventional link. Likewise, intensity noise, which scales as the square of the received total power, is reduced by approximately 20 dB. Also, since the carrier is not present, more signal power can be launched into the transmission fibers 51, 52 or detected by the photodetectors 71, 72 before fiber nonlinearity or saturation becomes a problem. Hence substantial improvements in link performance can be achieved.

It should also be noted that both of the complementary NTEOCs are not required to create a link with good performance. Removal of one link, as described by FIG. 4, results in an output from the modulator 14 (or other NLEOC) that has a high component of even-order distortion, but may also have a strong signal component. This technique has been explored in the prior art using Mach-Zehnder (MZ) modulators. However, the light-output-versus-voltage-input (L-V) transfer function for these modulators is such that biasing at close to zero transmission (the threshold in the ideal NTEOC) results in vanishingly small modulated signal output. This limits the utility of MZ modulators in this manner. However, a device with a more abrupt threshold, like the NLEOC described in FIG. 3, would provide good performance. The output RF signal power would be reduced by 6 dB relative to the two-device Class-AB approach, and the shot noise would be reduced by 3 dB (only one detector). Therefore, a net reduction in signal-to-shot-noise ratio of 3 dB would be realized relative to Class AB. However, this would still provide substantial improvement in performance relative to the conventional approach.

Figure 4:
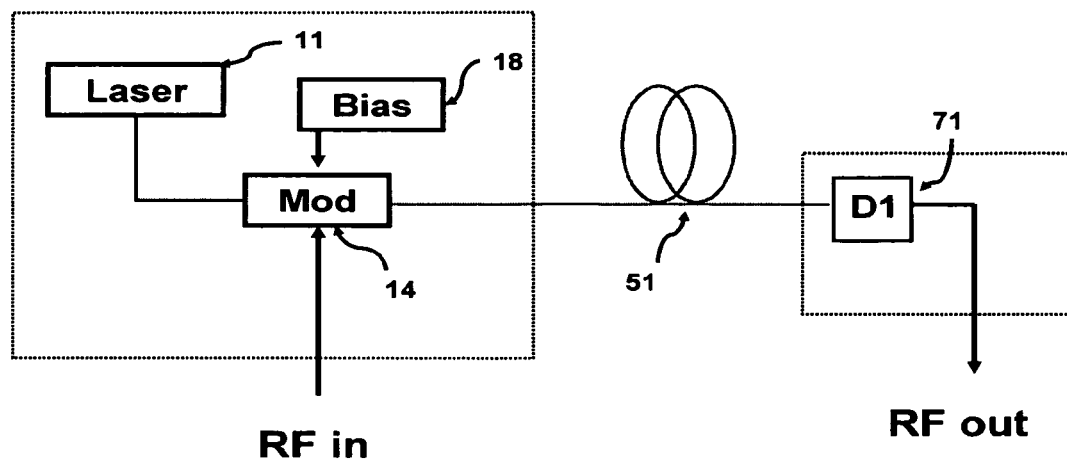
FIG. 4 is a schematic block diagram illustrating an alternative use of a single nonlinear threshold electric-to-optic converter in accordance with another embodiment.

Under conditions of ideal balance between the two complementary paths 14 to 71 and 15 to 72, the even-order distortion generated by each NTEOC (14) would be exactly cancelled by that of the other (15). The Class-AB approach is then capable of operation over a broad RF bandwidth (for example, 2-20 GHz) over which even-order distortion products must be tolerated. However, it is realized that substantial even-order distortion will be generated by each NTEOC, and that exact cancellation will be difficult. For applications with small fractional bandwidths (e.g. 5-10 GHz, or 19-20 GHz), all even-order distortion falls outside of the band of interest, and balancing is far less critical. Therefore, the single-NTEOC approach described in FIG. 4 is applicable to small fractional bandwidths only.

While the ideal transfer function described in FIG. 1 is difficult to realize in practice, several methods are available that provide a sufficiently close approximation that the advantages of the approach remain. Any means of optical intensity modulation with a reasonable approximation to a threshold can be used. Examples of suitable modulation methods include, but are not limited to direct laser modulation, laser modulation using an injection-locked laser, external modulation with Mach Zehnder modulators, external modulation with an electro-absorption or multi-quantum-well modulator, and various forms of nonlinear optical fiber or waveguide switches, all of which can be operated in a manner approximating a NTEOC.

Direct laser modulation has the benefit of low cost, small size, and low power consumption. For conventional MPLs, the laser is biased to a linear operating point on the light-versus current (L-I) curve, and the microwave signal is added as a modulation current, as illustrated in FIG. 3A. For Class AB, the laser is biased close to but slightly above threshold current, such that the only the positive (or negative in the complementary branch) portions of the microwave signal result in light output in direct proportion to the signal. While simple in principle, several challenges must be overcome. Relative intensity noise (RIN) from lasers that can be directly-modulated (e.g. distributed feedback (DFB) lasers) tends to be high when operated only slightly above threshold. Fortunately, the deleterious effect of RIN is reduced dramatically (e.g. 20 dB) with Class-AB operation. Also, the impedance of each laser diode, as seen by the microwave source, is a function of the laser bias. In the vicinity of the laser threshold current, the positive-negative junction begins to conduct, making a transition from an open circuit to a relatively low-impedance (a few ohms) at currents well above threshold. This raises challenges in designing a drive circuit for the pair of Class-AB lasers that will not induce additional signal distortion. Finally, lasers operated at low bias currents are subject to nonlinear distortion referred to as resonance distortion that results from photon-carrier dynamics within the laser diode. This distortion is exacerbated by the low resonance frequency associated with the low bias current. However, all these complications are reduced by biasing the laser slightly above threshold and settling for Class-AB operation rather than a closer approximation to the ideal Class B.

It has been shown recently that injection-locking techniques can be used to reduce intensity noise and increase the resonance frequency dramatically in directly-modulated laser diodes. When a strong continuous-wave (un-modulated) laser diode is coupled directly into a directly-modulated slave laser, the resultant output of the injection-locked slave laser exhibits greatly enhanced bandwidth, with lower noise and distortion. It may also be possible to modulate the power of the master laser, thereby creating a threshold-like transfer function of the slave laser during the transition from free-running to injection-locked oscillation. These techniques may substantially increase the utility of direct modulation for CAB-MPLs.

Figure 5:
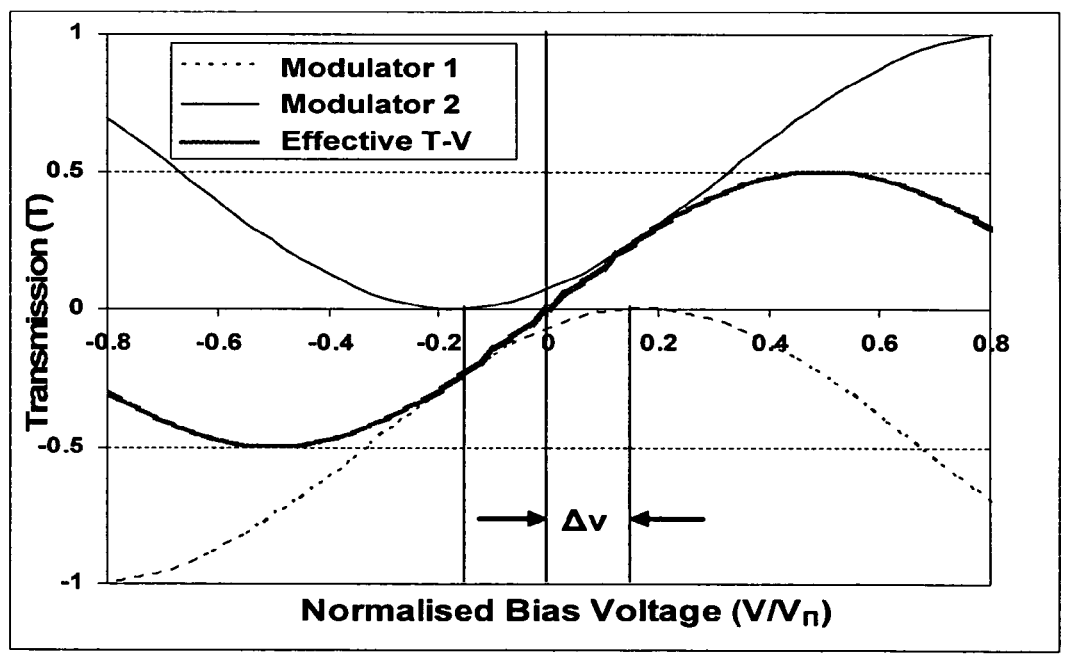
FIG. 5 is a graph illustrating the use of 2 Mach-Zehnder modulators in accordance with an embodiment.

Mach Zehnder (MZ) or electro-absorption modulators (EAM) are the most widely used forms of external modulators, and either can be used. For MZ modulators, the transfer function is sinusoidal, as shown in FIG. 5. This is true for devices made using, for example, Lithium Niobate, or any other electro-optic material. It applies also for devices using polarization-mode coupling instead of the normal MZ structure. Complementary operation and detection in the balanced detector provides an effective transfer function that is also sinusoidal, but with zero average optical power. This is shown in FIG. 5, which shows the transfer functions of the two complementary MZs 14 and 15, (FIG. 1) as seen by the output of receiver 70. Photocurrent detected in detector 71 is shown as a positive current. Photocurrent detected by detector 72 is subtracted from that in detector 71, so this is shown as negative current. Under conventional operation conditions, a MZ—is biased with a relative phase difference between the two combined signals of 90 degrees (relative to zero transmission). At this point, the Mz has transmission of 50% (0.5 on FIG. 5) of the maximum transmission (1 on FIG. 5), and quite linear modulation response. For Class AB, we operate the modulators relatively close to where the light output is zero, typically less than 30 degrees of relative phase difference from zero transmission. Each modulator is thereby operated in a highly-nonlinear mode that approximately half-wave for large input voltages rectifies the signal. However, the sum of the two detector outputs is the effective T-V sinusoid shown in FIG. 5, with effectively linear response and zero-average. Detailed analysis and experimental implementation indicate substantial improvement in link performance can be achieved with Mzs. We predict and have demonstrated experimentally greater that 5 dB reduction in shot noise, and almost complete elimination of intensity noise.

It is also possible to alter the normally-sinusoidal transfer function for a MZ by adding additional phase-controlled paths to the simple MZ structure. This has been used to create a more linear transfer function in the vicinity of the conventional bias point. It has been shown that, for example, combining the outputs of two MZs in parallel can create transfer functions that have a more ideal saw-tooth shape than the conventional sinusoid. Similar techniques should be able create a more ideal threshold behavior for Class AB than a standard MZ.

EAMs have become attractive for communications, as they offer small size and low power consumption. They can also be integrated with source lasers and optical amplifiers. Transfer functions for these devices can be quite linear when operated at the bias point for a conventional link. For CAB operation, the threshold behavior and linearity can be better than an MZ.

Several methods or NTEOCs for generating the approximately half-wave rectified signals have been discussed. These are representative of wider class of existing and future modulation techniques that can provide a suitable transfer function. It is also possible to use optical amplification before or after external modulation, or after direct modulation, to increase optical signal power levels.

Figure 6:
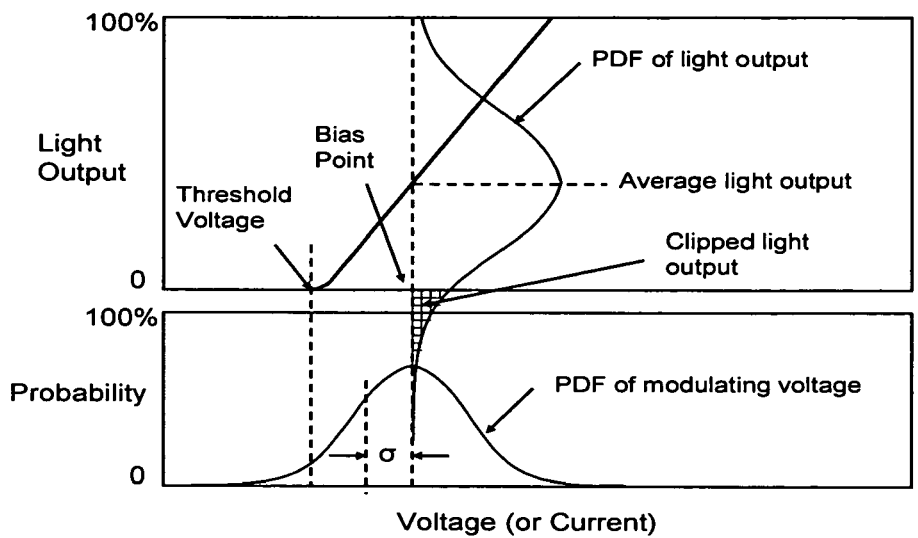
FIG. 6 is an illustration defining a method for quantifying the operational difference between an embodiment of the disclosed technology and prior art, in terms of modulation conditions applied to each nonlinear threshold electric-to-optic converter.

Since the term "half-wave rectified" is somewhat subjective, it is useful to define means to quantify the degree of nonlinear rectification occurring in the NTEOC. Operation of a typical conventional analog link is described in FIG. 6, which shows the transfer function of a device with a sharp threshold. When modulated by a microwave signal, the device is typically biased to a bias point (e.g. voltage) that is sufficiently high that the addition of modulating microwave signal (voltage) creates a reasonably accurate replica of the microwave signal in light output. As the modulating signal increases, the laser may be driven below threshold, resulting in clipping of the light output, as shown in FIG. 6. This creates nonlinear distortion and impulse noise that limit transmission quality. System design is a tradeoff between increasing the modulating signal, hence improving signal output, and tolerating this clipping-induced distortion.

For arbitrary forms of microwave input signals, the probability of clipping can be seen in FIG. 6 from the overlap between the probability density function (PDF) of the input microwave signal S(V), and the device transfer function. Distribution S(V) may take on a variety of forms, and the expected value can be defined as $$E(V^2) = \int_{-\infty}^{+\infty} V^2 S(V) dV,$$

a simple quantity representative of the statistical range of voltages contained within the microwave signal. If the input signal consists of a large number (N) of equal-amplitude sinusoidal signals, this PDF becomes a Gaussian distribution with variance $\sigma^2$, where $\sigma$ is given by $\sigma = V_p \sqrt{N/2}$ is the number of channels and $V_p$ is the peak voltage for one channel. In a conventional link, the ratio of $\sigma$ to the difference between bias and threshold voltages is rarely greater that 0.4 (roughly as shown in FIG. 6). Since the difference between bias and threshold is translates directly to the average light output, and $\sigma^2$ translates directly to the variance of the light output (intensity modulation), this ratio is equivalent to the well-known normalized modulation index $\mu$. In the ideal (Class B) embodiment, the bias voltage is equal to the threshold voltage. Therefore, $\mu$ becomes infinite. This corresponds to ideal half-wave rectification of the signal S(V) during conversion to modulated optical power. For non-ideal (class AB) some bias voltage is used. While it is desirable to operate each of the complementary transmitters as close to half-wave rectification as possible, other practical concerns may prevent this. Therefore, a way to distinguish Class-AB operation from conventional operation is to define Class AB as operation in which each NTEOC is operated with $\mu$ greater than approximately 0.7. By using $\mu$, this metric can be applied to all forms of NTEOC transfer functions, including those, like a MZ, in which the transfer function is nonlinear. Alternatively, one could define Class-AB as operation with modulation conditions for which $\sigma$ is greater than the difference between the bias point and the threshold point.

Figure 7:
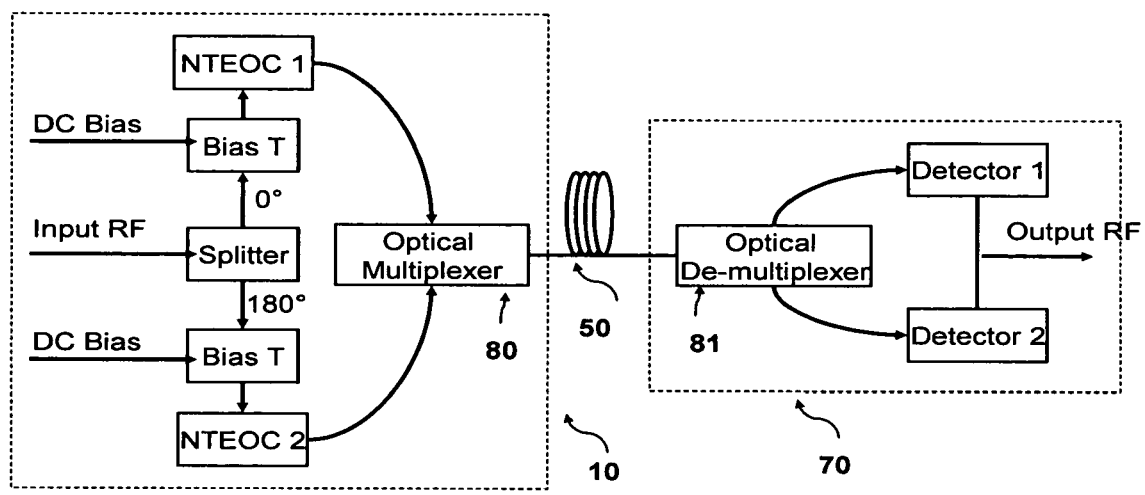
FIG. 7 is a schematic block diagram illustrating another embodiment in which only one transmission fiber is used.

Once the complementary optical signals have been generated at the outputs of each NTEOC, several configurations can be used to convey the signals to the photodetectors. A simple solution is to use two separate optical fibers 51 and 52, one for each signal, as defined in FIG. 1. This method is already used in conventional links where intensity noise is cancelled using a dual-output MZ. Alternatively, the two signals can be combined for transmission along a single fiber, then separated prior to the two detectors, as shown in FIG. 7. Multiplexer 80 and de-multiplexer 81 are added to the transmitter 10 and receiver 70, respectively to combine and separate the two signals onto one optical path 50. The methods for combining could include, but are not limited to wavelength-division multiplexing, polarization multiplexing, and in principle, time-division multiplexing.

For single or dual-fiber implementations, the phases of the two received signals must be aligned. This can be done by adjusting or controlling the fiber lengths. Optical delay lines are available from many suppliers that enable fine tuning of the fiber length. Alternatively, the phase of the microwave signals can be adjusted prior to each NTEOC, or after the photodetectors but before combining in the receiver.

Free-space communications could also benefit from the reduced noise achieved with Class-AB techniques. In this case, the optical fiber 50 or fibers 51, 52 of the optical transmission path 50 would be replaced with free-space optical path(s) between telescopes or lenses. The same considerations apply to single or dual-path approaches. Phase alignment can be done by varying the phase of the microwave signal, or by adjusting the optical path length.

Detection can be implemented using a balanced receiver 70, which subtracts the photocurrent generated in one detector directly from that generated in the other. Alternatively, two separate detectors 71 and 72 can be used, and the output of one inverted relative to the other prior to or during combining of the microwave signals. This can be done using a variety of microwave devices including 180 degree hybrids, inverters, and 90 degree hybrids. Any type of detector can be used, including PiN photodiodes, avalanche photodetectors, or MSM detectors.

The foregoing is a description of several embodiments. As would be known to one skilled in the art, variations that do not vary the scope of the embodiments are contemplated. For example, the optical source or NTEOC can be a laser (e.g. diode, semiconductor, solid state, rare-earth-doped fiber) followed by an external modulator (e.g. Mach-Zehnder, electro-absorption, polarization-mode converter) or a directly-modulated laser (e.g., diode, semiconductor).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims.

We claim:

1. A photonic link having low residual carrier, for use in transmitting information between an electronic signal source and an electronic signal receiver, said photonic link comprising:

a transmitter to accept electronic information from said electronic signal source and to transmit optical signals, said transmitter comprising a first and second non-linear threshold electronic to optical converter to convert said electronic information into optical signals and wherein said non-linear threshold electrical to optical converters are biased to provide large even-order distortion; said first non-linear threshold electrical to optical converter being complementary to said second non-linear threshold electrical to optical converter, to provide a first and second modulated signal, said first modulated signal being complementary to said second modulated signal;

an optical signal receiver; and at least one optical transmission path to transmit said complementary modulated signals between said transmitter and said optical signal receiver, whereby the optical signal receiver reconstructs said complementary modulated signals into said electronic information for acceptance by the electronic signal receiver.

2. The photonic link of claim 1 wherein said first and said second non-linear threshold E-O converters comprise at least one directly modulated optical source.

3. The photonic link of claim 2 wherein either said first or said second non-linear threshold E-O converters comprise at least one directly modulated optical source.

4. The photonic link of claim 1 wherein said first and said second non-linear threshold E-O converter comprise at least one external modulator configured to modulate the output of at least one optical source.

5. The photonic link of claim 4 wherein said first or said second non-linear threshold E-O converter comprises one externally modulated laser.

6. The photonic link of claim 5 further comprising at least one modulator.

7. The photonic link of claim 4 wherein said modulators are Mach-Zehnder modulators.

8. The photonic link of claim 4 wherein said modulators are electro-absorption modulators.

9. The photonic link of claim 1 wherein said optical signal receiver comprises a balanced receiver.

10. The photonic link of claim 9 wherein said balanced receiver comprises a first and a second photodetector, each having an anode and a cathode, wherein said anode of said first photodetector is connected to the cathode of said second photodetector, such that in use, the electronic information is reconstructed.

11. The photonic link of claim 10, wherein said at least one optical transmission path comprises one transmission fiber.

12. The photonic link of claim 10, wherein said at least one optical transmission path comprises two transmission fibers.

13. The photonic link of claim 10 wherein said at least one optical transmission path comprises at least one free-space optical path.

14. A photonic link having low residual carrier, for use in transmitting information between an electronic signal source and an electronic signal receiver, said photonic link comprising:

a transmitter to accept electronic information from said electronic signal source and to transmit optical signals; said transmitter comprising a first and second non-linear threshold electronic to optical converter to convert said electronic information into optical signals, said first non-linear threshold electrical to optical converter being complementary to said second non-linear threshold electrical to optical (E-O) converter and wherein said non-linear electrical to optical converters are biased to provide large even-order distortion, to provide a first and second modulated signal, said first modulated signal being complementary to said second modulated signal; said E-O converter comprising a directly modulated optical source;

an optical signal receiver, said optical signal receiver comprising a first and a second photodetector, each having an anode and a cathode, wherein said anode of said first photodetector is connected to the cathode of said second photodetector;

one transmission fiber; and a combiner to combine said first and second modulated signals over the one transmission fiber and to separate them at the optical signal receivers to transmit said complementary modulated signals between said transmitter and said optical signal receiver, whereby the optical signal receiver reconstructs said complementary modulated signals into said electronic information for acceptance by the electronic signal receiver.

15. A method of transmitting information between an electronic signal source and an electronic signal receiver comprising:

accepting electronic information from said electronic signal source;

biasing each of two nonlinear threshold electronic to optical converters to provide large even-order distortion;

converting said electronic information into two complementary modulated optical signals with large even-order distortions;

transmitting said complementary modulated optical signals; and reconstructing said complementary modulated signals into said electronic information for acceptance by the electronic signal receiver.

16. The method of claim 15 wherein said electronic information is microwave.

17. The method of claim 16 wherein said conversion is effected by converters operating at a bias point such that the square root of the variance of the modulating microwave signal is greater than the difference between the bias point and the threshold point.

18. The method of claim 16 wherein said conversion is effected by converters operating at a bias point that provides a normalized modulation index of greater than approximately 0.7.

19. The method of claim 16 wherein said conversion comprises modulating the output of at least one optical source by applying the electronic information with at least one external modulator.

20. The method of claim 19 wherein modulating is effected by said modulators operating in a highly non-linear mode.

21. The method of claim 20 wherein said modulators are operating at a bias point of less than approximately 25% maximum transmission.

22. The method of claim 21 wherein said modulators are operating at a bias point of less than approximately 20% maximum transmission.

23. The method of claim 22 wherein said modulators are operating at a bias point of less than approximately 15% maximum transmission.

24. The method of claim 20 wherein said modulators are Mach-Zehnder modulators.

25. The method of claim 24 wherein biasing of the modulators is at less than 45 degrees from zero transmission.

26. The method of claim 25 wherein biasing of the modulators is at less than 40 degrees from zero transmission.

27. The method of claim 26 wherein biasing of the modulators is at less than 35 degrees from zero transmission.

28. The method of claim 27 wherein biasing of the modulators is at less than 30 degrees from zero transmission.

29. The method of claim 16 further comprising multiplexing to combine said complementary modulated optical signals for transmission on one transmission fiber.

30. The method of claim 16 further comprising optical amplification.

31. A photonic link having low residual carrier, for use in transmitting information between an electronic signal source and an electronic signal receiver, said photonic link comprising:
- a transmitter to accept electronic information from said electronic signal source and to transmit an optical signal, said transmitter comprising a non-linear threshold electronic to optical converter to convert said electronic information into an optical signal and wherein said non-linear threshold electrical to optical converter is biased to provide large even-order distortion and in which said converter is biased such that a normalized modulation index exceeds 1;
- an optical signal receiver; and
- an optical transmission path to transmit said optical signal between said transmitter and said optical signal receiver, whereby the optical signal receiver reconstructs said optical information into reconstructed electronic information containing large even-order distortion for acceptance by the electronic signal receiver.

32. The photonic link of claim 31 wherein said optical transmission path comprises a free-space optical path.

33. A method of transmitting information between an electronic signal source and an electronic signal receiver comprising:
- accepting electronic information from said electronic signal source;
- biasing a nonlinear threshold electronic to optical converter to provide large even-order distortion and a normalized modulation index exceeding 1;
- converting said electronic information into an optical signal with large even-order distortions;
- transmitting said optical signal; and
- reconstructing said optical signal into reconstructed electronic information containing large even-order distortion for acceptance by the electronic signal receiver.

34. The method of claim 33, wherein said optical signals are transmitted by a free-space optical path.

* * * * *